(12) United States Patent
Vermillion

(10) Patent No.: US 9,930,872 B2
(45) Date of Patent: Apr. 3, 2018

(54) LIGHTING DEVICE FOR FISHING POLE

(71) Applicant: Lukus Vermillion, Humble, TX (US)

(72) Inventor: Lukus Vermillion, Humble, TX (US)

( * ) Notice: Subject to any disclaimer, the term of this patent is extended or adjusted under 35 U.S.C. 154(b) by 0 days.

(21) Appl. No.: 15/298,043

(22) Filed: Oct. 19, 2016

(65) Prior Publication Data

US 2017/0038016 A1   Feb. 9, 2017

(51) Int. Cl.
*A01K 87/00*   (2006.01)
*F21V 33/00*   (2006.01)

(52) U.S. Cl.
CPC .......... *A01K 87/007* (2013.01); *F21V 33/008* (2013.01)

(58) Field of Classification Search
CPC .................. A01K 87/00–87/085; F21V 33/008
See application file for complete search history.

(56) References Cited

U.S. PATENT DOCUMENTS

| | | | | |
|---|---|---|---|---|
| 2,565,633 A * | 8/1951 | Scott | .................... | A01K 87/007 362/197 |
| 3,862,509 A * | 1/1975 | Petersen, Jr. | ........ | A01K 87/002 43/17.5 |
| 4,085,437 A * | 4/1978 | Hrdlicka | .............. | A01K 87/007 362/109 |
| 5,083,247 A * | 1/1992 | Robinson | ............. | A01K 87/007 362/109 |
| 5,172,508 A * | 12/1992 | Schmidt | ............... | A01K 87/007 43/17.5 |
| 5,276,990 A * | 1/1994 | Ramirez | .............. | A01K 87/007 43/17.5 |
| 5,738,433 A * | 4/1998 | Sparks | ................. | A01K 87/007 362/109 |
| 5,826,366 A * | 10/1998 | Matibe | ................. | A01K 87/007 43/17.5 |
| 2006/0288629 A1 * | 12/2006 | Parker | .................. | A01K 87/007 43/17.5 |
| 2011/0162253 A1 * | 7/2011 | Cobb | ................... | A01K 87/007 43/17.5 |

* cited by examiner

*Primary Examiner* — Mariceli Santiago
(74) *Attorney, Agent, or Firm* — Law Office of Jeff Williams; J. Oliver Williams

(57) ABSTRACT

A fishing pole including a handle, a lighting unit, a switch and a power storage unit. The lighting unit is located at least partially internal to the handle. The switch is configured to regulate operation of the lighting unit and the power storage unit is configured to energize the lighting unit.

19 Claims, 4 Drawing Sheets

LIGHTING DEVICE FOR FISHING POLE

BACKGROUND

1. Field of the Invention

The present application relates generally to a light, and in particular to a light that is inside a fishing pole handle.

2. Description of Related Art

Some advantages of nighttime fishing versus daytime fishing include lower temperatures during the summer season and fewer boats on the water, especially jet skis. However, darkness makes many tasks such as baiting a hook, tying a knot, and finding a snack difficult. Flashlights and lanterns are the common solution to providing light at night. Lanterns tend to be bulky, especially gas lanterns. Small flashlights are prone to being lost among other items or being dropped in the water.

Boats are often required to have navigation lights to help avoid collision with other craft. White, red and green lights are usually used for this purpose. Electric light bulbs burn out at inconvenient times and it would be good to have a spare flashlight handy for immediate use. An extra light that selectively emits colored light would be beneficial.

It is desired that a system be developed to permit an electric flashlight to be easily found and operated while fishing. Placing a flashlight into a fishing pole handle would solve the problem of losing track of a flashlight while fishing. It is further desired that the flashlight be selectively configured emit white, red and/or green light in case a navigation light burns out. A further advantage would be to operate the fishing pole light with the hand holding the fishing pole handle without having to take the hand off the handle. Although great strides have been made, considerable shortcomings remain.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1A:
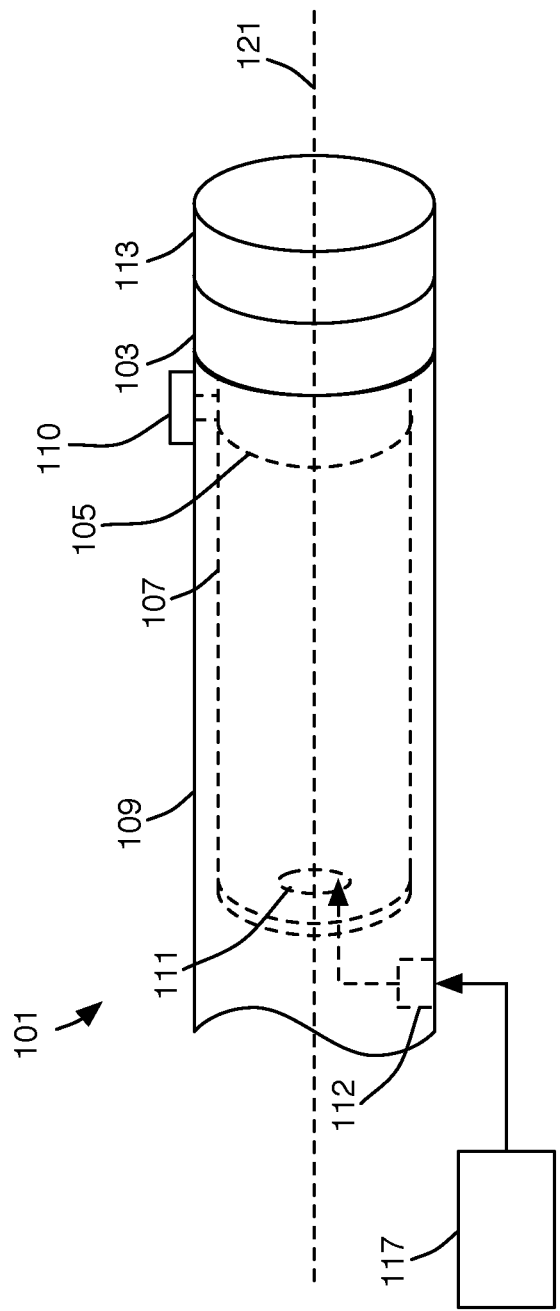
FIG. 1A illustrates a lighting device for a fishing pole in which the lighting device is a part of the fishing pole handle according to an embodiment of the present application.

While the assembly and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method in accordance with the present application overcomes one or more of the above-discussed problems commonly associated nighttime fishing. A fishing pole that includes a handle, a lighting unit, a switch and a power storage unit. The lighting unit is located at least partially internal to the handle. The switch is configured to regulate operation of the lighting unit and the power storage unit is configured to energize the lighting unit. These and other unique features of the system and method are discussed below and illustrated in the accompanying drawings.

The system and method will be understood, both as to its structure and operation, from the accompanying drawings, taken in conjunction with the accompanying description. Several embodiments of the assembly are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the drawings wherein like reference characters identify corresponding or similar elements in form and function throughout the several views. FIG. 1A illustrates a lighting device for a fishing pole in which the lighting device is part of the fishing pole handle. Lighting device 101 is comprised of a lighting unit 103, a switch 105, a power storage unit 107 and a handle 109. Lighting unit 103 is located at least partially internal to handle 109. Lighting unit 103 is coupled to switch 105. Switch 105 is coupled to handle 109 and configured to regulate operation of lighting unit 103. Lighting device 101 may also include a selection member 110 coupled to handle 109 and is in communication with switch 105. Selection member 110 allows the user to keep their hand on handle 109 while operating switch 105. Examples of selection member 110 are a sliding member, a push member or a rotary member. Switch 105 is coupled to lighting unit 103 and power storage unit 107. An example of switch 105 is a electrical two position on/off switch which operates by pushing down on selection member 110. Another example of switch may be an electrical multi-position switch which cycles through a series of electrical positions with each time a user presses selection member 110, regulating operation of lighting unit 103. Power storage unit 107 is configured to energize lighting unit 103. Examples of power storage unit 107 include alkaline batteries and capacitors. Other power storage unit 107 types are contemplated.

A longitudinal axis 121 runs down the center of handle 121. Lighting unit 103 may be configured to concentrate light along the longitudinal axis over a specific area. Light may be reflected and/or refracted to accomplish light concentration. Lighting device 101 may include an electrical port 112 coupled to power storage unit 107. Electrical port 112 is coupled to handle 109, making electrical port 112 accessible to the user. Electrical port 112 is configured to receive electrical energy to charge power storage unit 107. Lighting device 101 may also include a power supply 117, which may be coupled to electrical port 112. Examples of power supply 117 include a wall mount ac adaptor, a battery and a generator. Small generators used for emergency situations could even be partially located inside handle 109.

Lighting device 101 may also include a second electrical port 111, coupled to power storage unit 107 to couple to electrical port 112. The second electrical port is useful if power storage unit 107 is removed from handle 109 and charged outside of handle 109. If power storage unit 107 is not removable from handle 109, then second electrical port 111 is not needed.

Figure 1B:
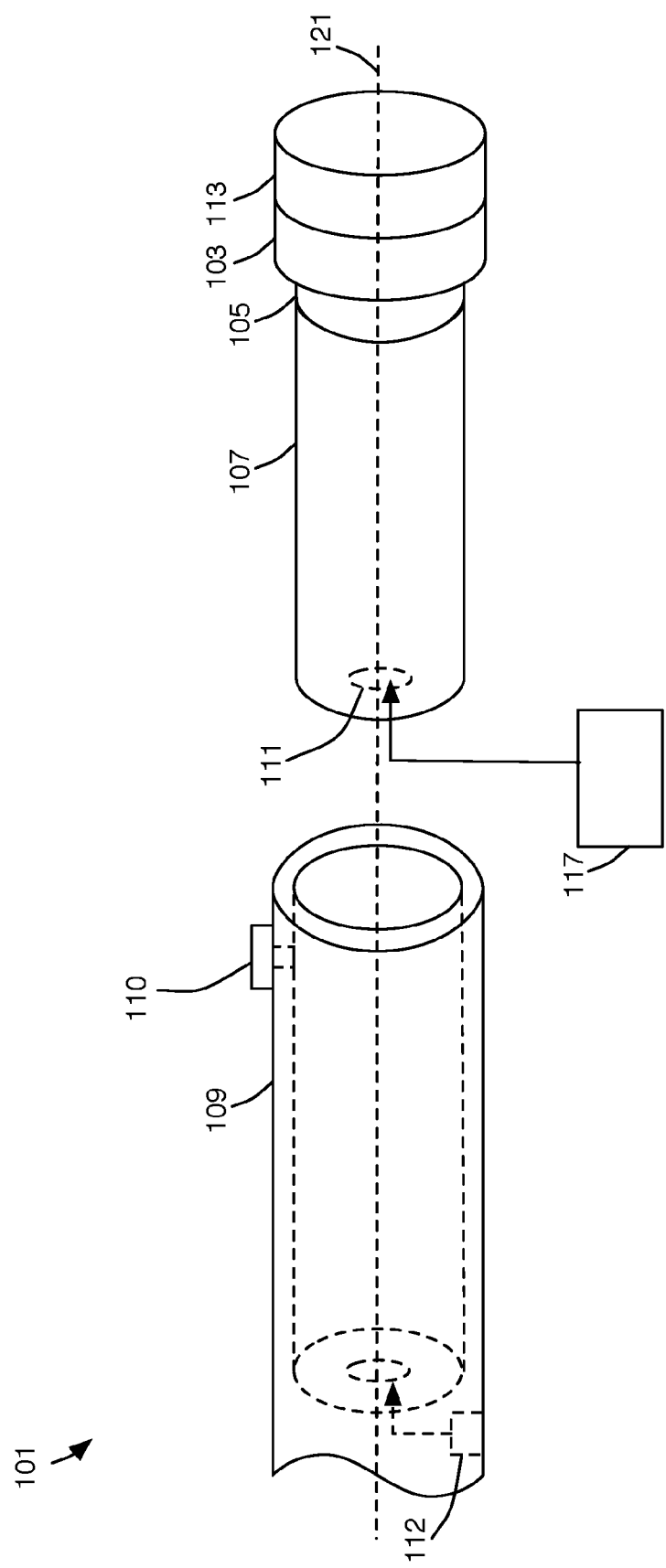
FIG. 1B illustrates a lighting device for a fishing pole in which the lighting device may be separated from the fishing pole handle according to an embodiment of the present application.

Referring now to FIG. 1B, portions of lighting device 101 may be removed from handle 109 and operated outside of handle 109. Lighting unit 103, switch 105 and power storage unit 107 may be interchangeably coupled in handle 109. Power storage unit 107 may be separated from switch 105 and lighting unit 103. Second electrical port 111 is coupled to power storage unit 107 and may be coupled to power supply 117.

Lighting unit 103 may include one or more light sources. Each light source may be configured to emit one or more colored light. An example of light colors are white, green and red, commonly used for navigation lights on boats. Examples of light sources include incandescent bulb, light emitting diode, fluorescent bulb and luminescent matter.

Figure 2A:
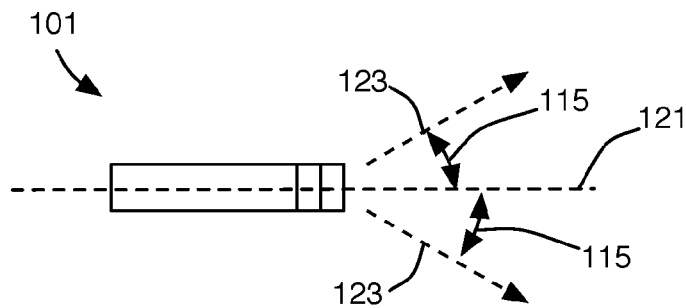
FIG. 2A illustrates a lighting device of FIG. 1A, in which the light is distributed over a range of angles centered on a longitudinal axis.
Figure 2B:
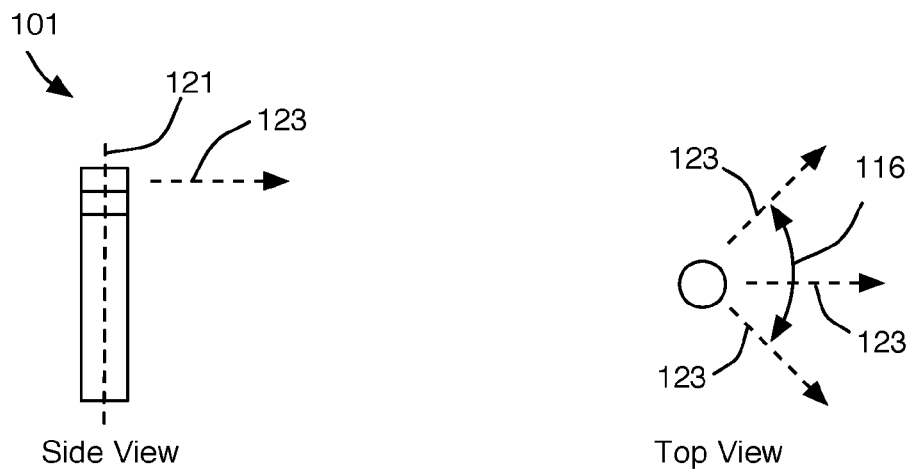
FIG. 2B illustrates a lighting device of FIG. 1A, in which the light is distributed laterally over a range of angles.
Figure 2C:
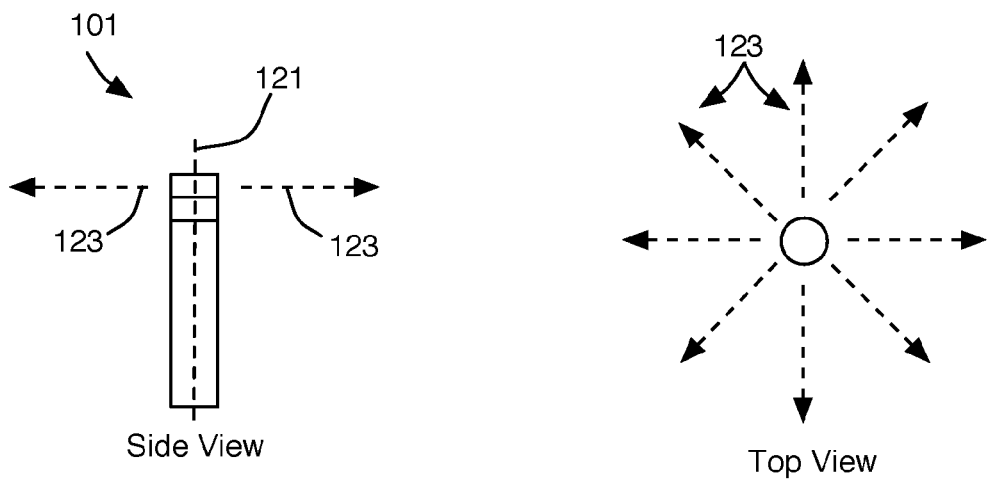
FIG. 2C illustrates a lighting device of FIG. 1A, in which the light is distributed laterally in a circular pattern.

Referring now to both FIGS. 1A and 1B, lighting device 101 may also include a lens 113 coupled to lighting unit 103. Lens 113 may be used to control the direction and/or color of light 123. Referring to FIGS. 2A-2C, longitudinal axis 121 is used as a reference. Referring now to FIG. 2A, lens 113 may be configured to distribute light axially over a range of angles 115 measured from axis 121. Referring now to FIG. 2B, lens 113 may be configured to distribute light laterally, at right angles to axis 121, over a lateral range of angles 116. Referring now to FIG. 2C, lens 113 may also be configured to distribute light laterally in a circular pattern. In another example lens 113 may be configured to distribute colored light such that red light and green light are emitted in selected directions. Light of specific colors may be selectively turned on and off.

Figure 3:
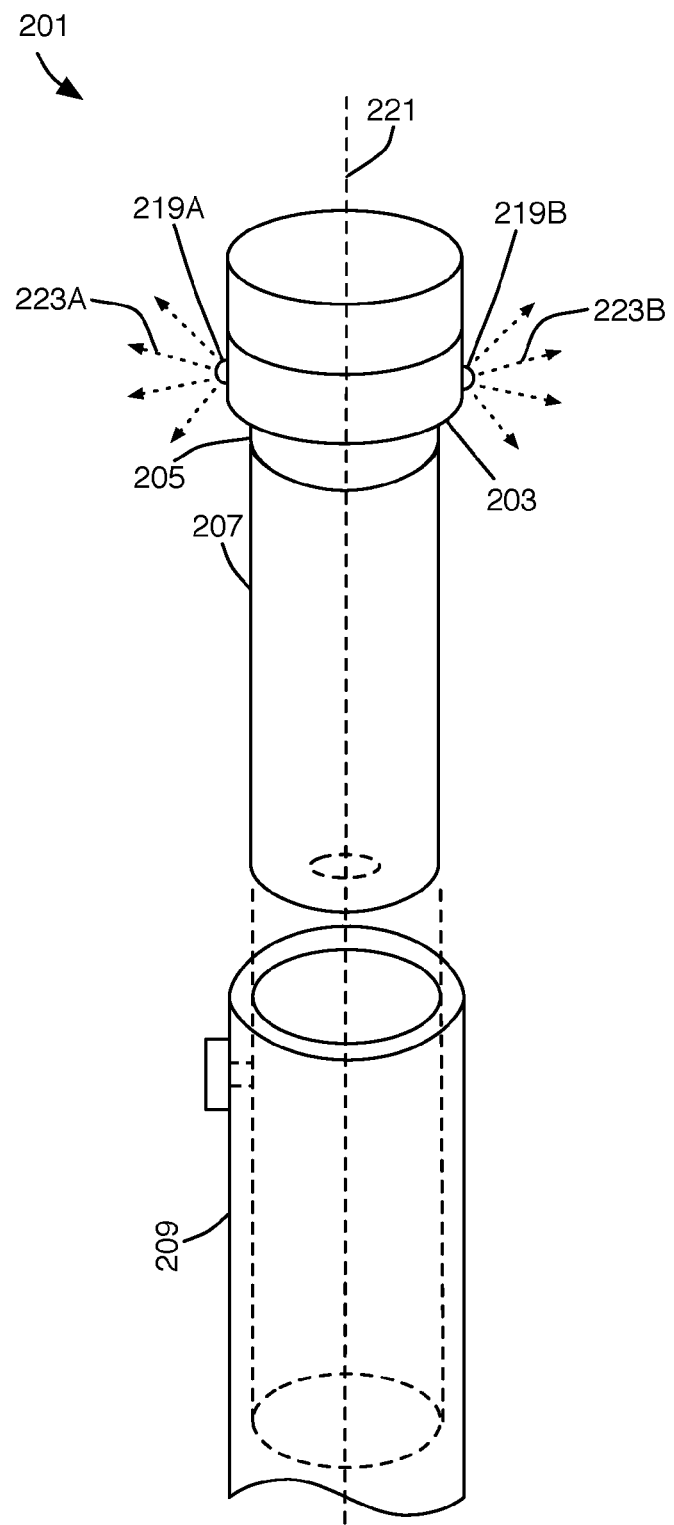
FIG. 3 illustrates an exploded view of an alternative embodiment of the lighting device of FIG. 1A, in which light sources are mounted on the side of the lighting device.

Referring now to FIG. 3, is an exploded view of an alternative embodiment lighting device 201. Lighting device 201 is similar to lighting device 101 in FIG. 1A, except for the differences noted. Lighting device 201 comprises a handle 209, lighting unit 203, a switch 205 and a power storage unit 207. Lighting unit 203 includes one or more light sources 219 mounted on the outside of lighting unit 203. Switch 205 may be configured to selectively energize light sources 219. An example is placement of a green light source 219A opposite a red light source 219B, with respect to an axis 221. In this manner green light 223A and red light 223B shine in opposite directions. Examples of light sources 219 are incandescent light and light emitting diode (LED).

The current application has many advantages over the prior art including at least the following: (1) the lighting device to be easily found while fishing; (2) the lighting device can be operated using one hand holding the handle; and (3) the lighting device be selectively configured to emit a red and green sidelight pattern.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A fishing pole comprising:
   a handle;
   a lighting unit located at least partially internal to the handle;
   a switch configured to regulate operation of the lighting unit; and
   a power storage unit configured to energize the lighting unit;
   a selection member coupled to the handle, the selection member in communication with the switch and configured to allow the user to operate the switch.

2. The device of claim 1, further comprising:
   an electrical port coupled to the handle configured to receive electrical energy to charge the power storage unit.

3. The device of claim 2, further comprising:
   a power supply wherein the power supply charges the power storage unit.

4. The device of claim 1, further comprising:
   a lens configured to distribute light over a range of angles.

5. The device of claim 4, wherein the lens is configured to distribute light in a lateral circular pattern.

6. The device of claim 1, wherein the lighting unit further comprises:
   one or more light sources.

7. The device of claim 6, wherein each light source emits at least one of a white light, a red light and a green light.

8. The device of claim 5, wherein the switch is a rotary multi-position switch configured to selectively regulate operation of each light source.

9. The device of claim 1, wherein the lighting unit is configured to concentrate light over a selected area.

10. The device of claim 1 wherein the lighting unit is configured to selectively emit light of one or more color.

11. The device of claim 6, wherein one or more light sources are coupled to the lighting unit, each light source configured to emit light away from an axis.

12. The device of claim 11, including:
a first light source configured to emit a green light; and
a second light source configured to emit a red light;
wherein the first light source and the second light source emits light in opposing directions.

13. A lighting device for a fishing pole having a handle, comprising:
a lighting unit located at least partially internal to the handle;
a switch configured to regulate operation of the lighting unit; and
a power storage unit configured to energize the lighting unit;
a selection member in communication with the switch and configured to allow the user to operate the switch.

14. The device of claim 13, wherein the lighting device is interchangeable.

15. The device of claim 14, wherein the power storage unit separates from the lighting device.

16. The device of claim 14, further comprising:
an electrical port located on the lighting device configured to receive electrical energy to charge the power storage unit.

17. The device of claim 14 further comprising:
a lens configured to distribute light over a range of angles.

18. The device of claim 14 further comprising:
a lens wherein the lens is configured to distribute light in a lateral circular pattern.

19. The device of claim 14 further comprising:
a lens configured to distribute at least one of a red light, a green light, and a red light and green light.

* * * * *